UNITED STATES PATENT OFFICE.

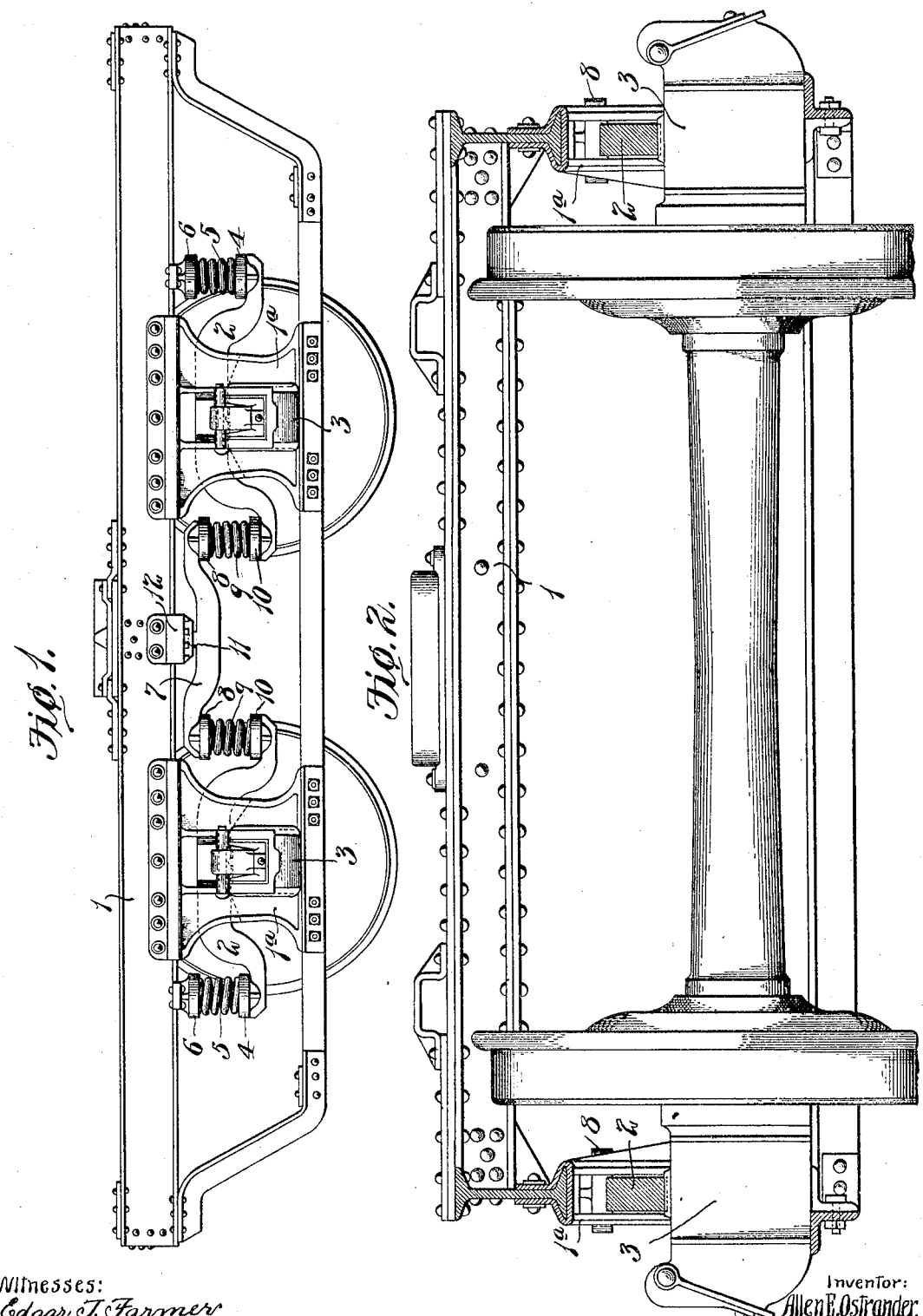

ALLEN E. OSTRANDER, OF PATERSON, NEW JERSEY, ASSIGNOR TO AMERICAN CAR & FOUNDRY COMPANY, OF ST. LOUIS, MISSOURI, A CORPORATION OF NEW JERSEY.

EQUALIZING DEVICE FOR CAR-TRUCKS.

No. 851,371.   Specification of Letters Patent.   Patented April 23, 1907.

Application filed February 13, 1907. Serial No. 357,162.

*To all whom it may concern:*

Be it known that I, ALLEN E. OSTRANDER, a citizen of the United States, residing at Paterson, New Jersey, have invented a certain new and useful Improvement in Equalizing Devices for Car-Trucks, of which the following is a full, clear, and exact description, such as will enable others skilled in the art to which it appertains to make and use the same, reference being had to the accompanying drawings, forming part of this specification, in which—

Figure 1 is a side elevation of a truck provided with an equalizing device constructed in accordance with my invention; and Fig. 2 is an enlarged cross sectional view of the truck shown in Fig. 1.

This invention relates to equalizing devices for car trucks.

Referring to the drawings, 1 designates the side frames of a car truck, and 2 are the equalizer bars or levers that are fulcrumed on the journal boxes 3 mounted in the pedestals 1ª, the opposite ends of said levers extending downwardly from the middle portions thereof. The outer end of each equalizer bar 2 is provided with a spring-seat 4 that supports a coiled spring 5 having its upper end engaging a spring-seat 6 fastened to the side frame of the truck. A lever 7 is arranged at each side of the truck and each lever is provided at its opposite ends with spring-seats 8 that receive the upper ends of coiled springs 9 which are supported by spring-seats 10 on the inner ends of the equalizer bars 2. At the middle of the lever 7 is a lug 11, which engages a bearing 12 depending from the side frame of the truck, said lug forming the fulcrum of said lever. A device of this description not only forms a very efficient means for equalizing the bearing of the truck frame on the journal boxes of the car axles, but is also strong and of simple construction.

Having thus described my invention, what I claim as new and desire to secure by Letters Patent is:

1. A car truck comprising side frames having pedestals for receiving journal boxes, equalizer bars adapted to rest on said journal boxes, coiled springs interposed between the outer ends of said bars and the side frames of the truck, a lever arranged at each side of the truck and adapted to oscillate in a vertical plane, and coiled springs interposed between the opposite ends of said lever and the inner ends of said equalizer bars; substantially as described.

2. A car truck comprising side frames having pedestals for receiving journal boxes, equalizer bars adapted to rest on said journal boxes, coiled springs interposed between the outer ends of said bars and the side frames of the truck, a lever arranged at each side of the truck and provided on its upper side with a lug, a bearing secured to the side frame and engaging said lug, and yielding members interposed between the opposite ends of said lever and the inner ends of the equalizer bars; substantially as described.

3. A car truck comprising a frame provided with pedestals for receiving journal boxes, equalizer bars fulcrumed on said journal boxes and having their ends extending downwardly, yielding devices interposed between the outer ends of said bars and the truck frame, levers arranged at each side of the truck frame and fulcrumed midway their ends, and springs interposed between the opposite ends of said levers and the inner ends of the equalizer bars adjacent thereto; substantially as described.

In testimony whereof I hereunto affix my signature in the presence of two witnesses, this 6th day of February, 1907.

ALLEN E. OSTRANDER.

Witnesses:
R. G. JEFFERY,
F. E. PERRY.